Dec. 1, 1970

L. W. SPEAKER 3,544,849

SOLID STATE TEMPERATURE CONTROL MEANS

Filed Feb. 29, 1968

INVENTOR.
LAWRENCE W. SPEAKER

BY *Walter C. Kehl*

HIS ATTORNEY

United States Patent Office 3,544,849
Patented Dec. 1, 1970

3,544,849
SOLID STATE TEMPERATURE CONTROL MEANS
Lawrence W. Speaker, Louisville, Ky., assignor to General Electric Company, a corporation of New York
Filed Feb. 29, 1968, Ser. No. 709,417
Int. Cl. H01h 47/26
U.S. Cl. 317—132          3 Claims

ABSTRACT OF THE DISCLOSURE

A solid state thermostat for controlling a space temperature condtoniing apparatus includes a differential amplifier circuit comprising a reference transistor and a load transistor with the load transistor connected to one terminal of a DC source through the operating coil of a relay controlling the operation of the conditioning apparatus. Voltage dividing means including a thermistor responsive to the space temperature supplies a variable voltage to the load transistor base to control the firing thereof and thereby the energization of the apparatus. A positive or in phase feedback from the collector of one transistor to the base of the other controls the operating temperature differential of the apparatus. In its application to the control of means for either heating or cooling a space, the voltage dividing means is so designed that by means of a single single-pole double throw switch, the connections of the load transistor voltage dividing means is reversed and also the feedback network is changed so that the same thermistor is employed for either heating or cooling control, with selected temperature differentials on heating and cooling.

BACKGROUND OF THE INVENTION

For comfortable conditioning of residences, offices or similar spaces, it is desirable to control the operation of the conditioning means, whether it be cooling, heating or both a heating and cooling means, by the temperature of the space being conditioned. In recent years, semiconductor or solid state devices have made possible improved heating or cooling temperature controls, such as that described in Pat. 3,243,609 Kompelien, which from the point of accurate temperature control has a number of advantages over prior bi-metal thermostat controls. However, such controls have normally featured a rather complicated electric circuitry including a reltaively large number of solid state devices which materially added to the costs of the controls.

SUMMARY OF THE INVENTION

The present invention has as a primary object thereof the provision of a relatively low cost solid state temperature control apparatus for controlling the operation of the space temperature conditioning device which may be either a furnace or a refrigerating system or any combination of such heating and cooling means. The control of the present invention includes a single thermistor positioned to sense the temperature of the space being conditioned, a constant voltage direct current source including positive and negative terminals and a differential amplifier circuit including the thermistor for energizing or de-energizing the space temperature conditioning device in response to changes in the temperature sensed by the thermistor. The differential amplifier circuit includes a reference transistor and a load transistor each having collector, emitter and base electrodes with the electrical operating means connecting the load transistor to one of the terminals. Voltage dividing means supplies a fixed voltage to the reference transistor base while the load transistor base is connected to one of the terminals by a fixed restrictor and to the other of the terminals through the thermistor. A change in the space temperature results in a change in the thermistor resistance which in turn determines whether the load transistor is turned "on" or "off" to energize or de-energize the electrical operating means. In order to decrease the temperature differential between the "on" and "off" operation of the control, the differential amplifier circuit includes a positive or in phase feedback circuit connecting the collector electrode of one transistor to the base of the other for increasing the gain of the differential amplifier circuit and thereby narrowing the temperature range in which the electrical operating means is energized and de-energized. A differential amplifier is normally considered to be a linear circuit, and the use of positive or in phase feedback is not used because it results in unstable operation. In reality the transistor differential amplifier is a non-linear circuit and a small amount of in phase feedback can be used to increase the gain of the circuit and still result in stable proportional operation. If the feedback is increased, a point is reached where the gain of the circuit approaches infinity and the circuit becomes unstable. If the feedback is increased beyond this point (the point of instability), then a bi-stable circuit results. This is a very desirable circuit in that it has a very small differential, it provides a snap or non-jittering switching action, and the differential can be set by selecting the value of a resistor.

In a preferred embodiment of the invention as applied to the control of a composite device for both heating and cooling an enclosure or space, the voltage dividing means for the load transistor includes switch means for reversing the terminal connections of the thermistor so that the same thermistor and transistors can be employed for both heating and cooling operations.

DESCRIPTION OF THE PREFERRED EMBODIMENTS

Figure 1:
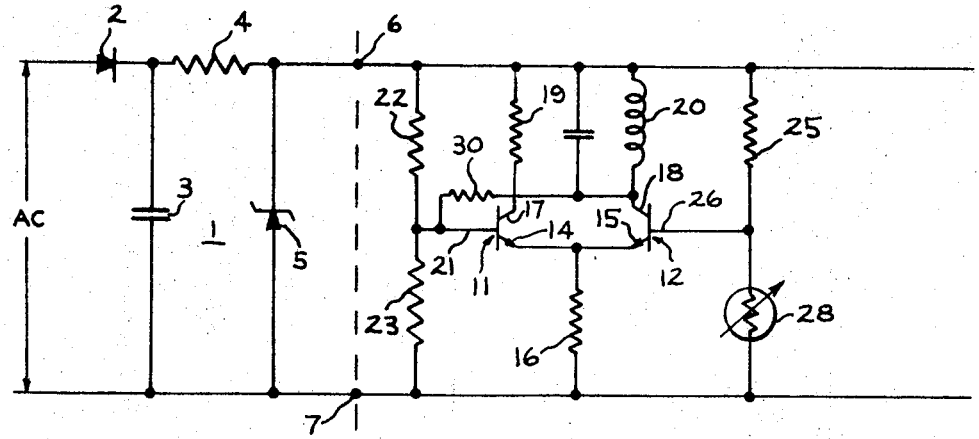
FIG. 1 is a schematic diagram of a temperature control circuit for controlling the operation of a furnace or similar heating means.

In the embodiment of the invention illustrated in FIG. 1 of the drawing there is provided a solid state thermostat conrtol for controlling the operation of a gas, oil or electric furnace or the like.

The illustrated circuit, which forms part of an overall electric control and operating circuitry for operating the electrically operated components of the heating means, includes a DC regulated voltage power supply generally indicated by the numeral 1 as comprising a standard half-wave rectifier including a rectifying diode 2, a filter capacitor 3, a dropping resistor 4 and a voltage regulating Zener diode 5 and adapted to supply a low DC voltage to a positive terminal 6 and a negative terminal 7.

Most of the remaining circuitry of FIG. 1 forms a differential amplifier including a first or reference transistor 11 and a second or load transistor 12 having their respective emitters 14 and 15 connected to the negative terminal 7 through a fixed resistor 16. The collector 17 of transistor 11 is connected to the positive terminal 6 through a fixed resistor 19 and the collector 18 of transistor 12 to the positive terminal by the coil 20 of a relay for controlling the energization of the heating means. Preferably the coil 20 is part of a reed relay and preferably has an effective resistance approximately the same as resistor 22.

The base 21 of the reference transistor 11 is connected to the terminal 6 through a resistor 22 and to the negative terminal through a resistor 23 which together form a voltage divider for supplying a fixed base voltage to the reference transistor 11.

The voltage divider circuit for the load transistor 12 includes a resistor 25 connecting the base 26 of the load transistor to the positive terminal 6 and a thermistor 28 connecting the base 26 to the negative terminal 7. This variable voltage divider circuit supplies a voltage to the base 26 which depends upon the resistance of the thermistor 28 which in turn is positioned to sense the temperature of the space being conditioned.

To increase the gain of the differential amplifier circuitry and thereby decrease the temperature differential at which the coil 20 will be energized and de-energized, there is provided a feedback circuit, including a feedback resistor 20, connecting the collector electrode 18 of the load transistor to the base 21 of the reference transistor 11.

In the illustrated circuitry in which thermistor 28 is connected to the negative terminal 6 and is used to control a heating means, the thermistor used is one having a negative temperature coefficient so that its resistance decreases with increased temperature. When the resistance of the thermistor 28 is low due to the fact that the temperature requirement of the space being conditioned is satisfied, base 26 will be sufficiently negative so that the transistor 11 will be "on" and the load transistor 12 "off." The relay coil 20 will therefore be de-energized and the circuit to the heating means open. Upon a decrease in temperature sensed by the thermistor 28 resulting in an increase in the resistance thereof, the base 26 of the load transistor 12 will become more positive and the transistor 12 will turn "on" and thereby turn transistor 11 "off." The load transistor 12 will remain turned "on" until the resistance of the thermistor 28 again decreases to a point where the base 26 of the transistor 12 becomes sufficiently negative to effect this action. When the transistor 12 is fully turned "on," the voltage across the feedback resistor 30 is essentially zero so that the voltage supplied to the base 21 of transistor 11 is essentially controlled by the values of resistors 22 and 23.

The desired function of the feedback resistor in the alternate "off" and "on" cycling of the two transistors 11 and 12 is primarily to decrease the length of these cycles so as to narrow the controlled range of temperatures in the conditioned space. More specifically, it can be seen that if the load transistor 12 is fully turned "on" so that the furnace is operating, the voltage across the feedback resistor 30 is essentially zero so that the base voltage for the transistor 11 is determined only by the resistance values of the resistances 22 and 23. However, if transistor 12 is turned "off" and transistor 11 is turned "on," then the voltage across the feedback resistor 30 is approximately the same as that across the resistor 22 since the resistance of the coil 20 is small as compared with the resistances of the resistors 22 and 30. As a result, there is produced an increase in voltage at the base 21 of the transistor 11 and this voltage is in phase with the action. During the turning "on" of the transistor 11, its base voltage is increased by the feedback causing it to turn "on" faster. Thus, depending upon the values of the resistors 22, 23 and 30, the gain in the differential amplifier can be increased independent of the gains in transistors 11 and 12 themselves resulting in shorter "on-off" cycles and a control of the space temperature within narrower temperature limits. This positive feedback from the collector of one transistor to the base of the other not only provides an amplifier gain independent of the transistor gains, but also has the additional advantage of achieving an electrical snap action in the control circuit.

Figure 2:
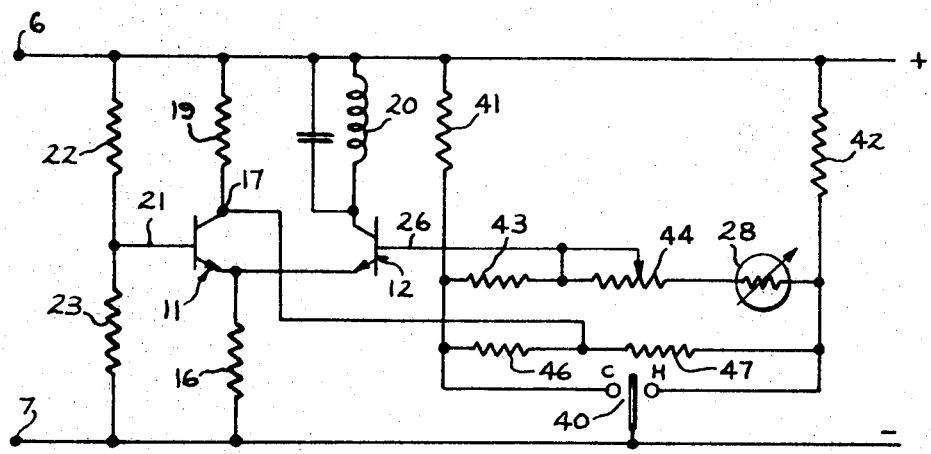
FIG. 2 illustrates a modification of the control of FIG. 1 for controlling the operation of both heating and cooling means.

The embodiment of the invention illustrated in FIG. 2 is designed to employ the same differential amplifier transistors and the same thermistor for either heating or cooling control. In describing the embodiment, the same reference numerals will be employed to indicate the same or similar components. For example, the reference transistor 11 includes the base 21 supplied with a voltage determined by the resistances of the resistors 22 and 23 in the voltage divider circuit for this transistor. However, the voltage divider circuit for the transistor 12 includes a plurality of resistors and the thermistor 28 as well as two feedback resistors interconnected in such a manner that a single-pole double throw switch permits use of the same differential amplifier transistor means and the same thermistor for controlling the space temperature on either heating or cooling.

More specifically, this voltage divider circuitry comprises two fixed resistors 41 and 42 connected to the positive terminal 6 and in turn connected to series-connected resistor 43, variable resistor 44 and the thermistor 28. The variable resistor 44 is provided for control point setting and compensation purposes and the base 26 of the transistor 12 is connected to the divider circuitry between the resistor 43 and the variable resistor 44.

Also connected to the resistors 41 and 42 and across the portion of the circuit including the resistors 43, 44 and the thermistor 28 are two feedback resistors respectively indicated by the numerals 46 and 47 with the junction between these two feedback resistors connected to the collector 17 of the transistor 11.

The single-pole double throw switch 40 provides means for connecting selected voltage divider resistors and the thermistor between the base 26 of the load transistor 12 and the terminals 6 and 7 and one or the other of the feedback resistors 46 and 47 between the collector 17 of the reference transistor 11 and the base 26 of the load transistor 12.

More specifically, when the switch 40 is in its heating position, the resistances 42 and 47 are shorted to the ground or negative terminal 7 and resistance 42 has no effect on the voltage supplied to the base of the transistor 12. The input voltage to the base 12 is determined by the resistors 41 and 43 connecting the base to the positive terminal 6 and the variable resistance 44 and the thermistor 28 connecting the base through the heating contact of the switch 40 to the negative terminal 7. The feedback which in this embodiment is from the reference transistor collector to the load transistor base, is through the feedback resistor 46 connected to the base of transistor 12 through the voltage divider resistor 43. This feedback operates in the manner equivalent to that of FIG. 1 in providing the electrical snap action and an amplifier gain independent of the actual transistor gains.

When the switch 40 is moved to its cool position, the feedback resistor 46 and the resistor 41 are grounded or connected to the negative terminal 7 and the voltage divider circuit determining the voltage supplied to the base of the load transistor 12 is determined by the total resistance of the resistor 42, the thermistor 28 and variable resistor 44 connected to the positive terminal 6 and the resistor 43 connecting the base 26 to the negative terminal 7. Thus, upon reversal from heating to cooling the thermistor 28 becomes the upper or positive side of the voltage divider circuit instead of the lower or negative side as in the heating operation. Also, in the cooling position of the switch 40 the resistor 47 becomes the feedback resistor connecting the collector 17 of the transistor 11 to the base 26 of the load transistor 12.

By reversing the connections of the thermistor 28 with reference to the positive and negative terminals in switching from one control position to the other, the same thermistor can be employed for both heating and cooling control. In other words when the thermistor 28 is connected between the load transistor base and the negative terminal 7 by moving switch 40 to its heating position, an increase in its resistance results in an energization of the relay coil 20 and when it was connected between the positive terminal and the base through switch 40 in its cooling position, a decrease in its resistance results in energization of the coil 20. Obviously, of course, the connection of the thermistor 28 in either of these positions for cooling or heating will depend also upon whether the thermistor has a negative or a positive temperature coefficient.

In one satisfactory reversible circuit, the values of the components were as follows:

| Reference No.: | | Value |
|---|---|---|
| 3 | mf | 75 |
| 4 | ohms | 400 |
| 5 | volts | 18 |
| 16 | ohms | 402 |
| 19 | do | 825 |
| 20 | DC ohms | 825 |
| 22 | ohms | 8060 |
| 23 | do | 4020 |
| 28 | ohms at 77° F. | 5K |
| 41 | ohms | 9K |
| 42 | do | 8060 |
| 43 | do | 9K |
| 44 | do | 7K |
| 46 | do | 35K |
| 47 | do | 35K |

It should also be understood that additional switch means may be necessary in connection with the relay actuated by the coil 20 for switching the connection of that relay from a cooling to a heating device or vice versa upon the movement of the control switch 40 from its cooling to heating position or vice versa.

From the above description, it will be seen that there has been provided a simple and low cost solid state control for heating, cooling or heating and cooling which includes a common emitter bistable differential amplifier having a positive feedback connected across a bridge circuit. This positive feedback provided from the collector of one transistor to the base of the other achieves an electrical snap action in the switching circuit and provides an amplifier by use of the respective transistors. Also, by means of a single-pole double throw switch in the voltage divider circuitry of one of the transistors, means are provided for reversing the connections of the voltage divider elements or components so that the same thermistor can be effectively employed for either heating or cooling control.

What I claim as new and desire to secure by Letters Patent of the United States is:

1. A solid state temperature control for controlling the operation of a space temperature conditioning device comprising:
  a relay including a relay coil for controlling the energization of said conditioning device;
  a thermistor responsive to the temperature of said space;
  a constant voltage direct current source including positive and negative terminals;
  a differential amplifier circuit comprising first and second junction transistors each having an emitter, collector and base electrodes with the emitters thereof connected to said negative terminal, a first resistor connecting said first transistor collector to said positive terminal, means including said coil connecting said second transistor collector to said positive terminal, voltage dividing means connecting said first transistor base to said terminals for supplying a fixed voltage to said first transistor base, second voltage dividing means for connecting the base of said second transistor to one terminal by a fixed resistor means and to the other terminal through said thermistor so that a variable voltage dependent upon the temperature sensed by said thermistor is applied to said second transistor base for comparison with the fixed voltage applied to said first transistor base whereby said second transistor is turned "on" to energize said coil at one temperature sensed by said thermistor and is turned "off" at a second temperature sensed by said thermistor to de-energize said coil;
  positive feedback means including a feedback resistor connecting the collector of one of said transistors to the base of the other transistor for increasing the gain of said differential amplifier, and controlling the temperature differential at which said coil is energized and deenergized; and
  switch means for reversing the terminal connection of said thermistor.

2. A solid state temperature control for controlling the operation of a space temperature conditioning device comprising:
  a relay including a relay coil for controlling the energization of said conditioning device;
  a thermistor responsive to the temperature of said space;
  a constant voltage direct current source including positive and negative terminals;
  a differential amplifier circuit comprising first and second junction transistors each having an emitter, collector and base electrodes with the emitters thereof connected to said negative terminal, a first resistor connecting said first transistor collector to said positive terminal, means including said coil connecting said second transistor collector to said positive terminal, voltage dividing means connecting said first transistor base to said terminals for supplying a fixed voltage to said first transistor base, second voltage dividing means for connecting the base of said second transistor to one terminal by a fixed resistor means and to the other terminal through said thermistor so that a variable voltage dependent upon the temperature sensed by said thermistor is applied to said second transistor base for comparison with the fixed voltage applied to said first transistor base whereby said second transistor is turned "on" to energize said coil at one temperature sensed by said thermistor and is turned "off" at a second temperature sensed by said thermistor to de-energize said coil;
  positive feedback means including a feedback resistor connecting the collector of one of said transistors to the base of the other transistor for increasing the gain of said differential amplifier, and controlling the temperature differential at which said coil is energized and deenergized; and
  said second voltage dividing means including switch means for connecting said thermistor to the positive terminal for cooling control operation and to the negative terminal for heating control operation.

3. The control of claim 2 including two feedback resistors, one of which connects the collector of said first transistor to the base of said second transistor during cooling control and the other of which connects the collector of said first transistor to the base of said second transistor during heating operation.

References Cited

UNITED STATES PATENTS

| 3,241,001 | 3/1966 | Gutow et al. | 317—148.5 |
| 3,377,545 | 4/1968 | Tveit | 323—19 |
| 3,441,810 | 4/1969 | Traina | 317—142 |
| 3,243,609 | 3/1969 | Kompelien | 307—297 |
| 3,005,915 | 10/1961 | White | 250—214 |

J D MILLER, Primary Examiner

C. L. YATES, Assistant Examiner